United States Patent

Hunts et al.

[15] 3,675,624

[45] July 11, 1972

[54] APPARATUS FOR ROTATING WORK FOR THIN FILM DEPOSITION

[72] Inventors: Barney D. Hunts, Los Altos Hills; William O. Lyon, Sunnyvale, both of Calif.

[73] Assignee: The Singer Company, New York, N.Y.

[22] Filed: Aug. 6, 1970

[21] Appl. No.: 61,532

[52] U.S. Cl. .................... 118/503, 118/56, 269/57

[51] Int. Cl. .................... B05c 11/14

[58] Field of Search .................... 118/48–49.5, 500

[56] References Cited

UNITED STATES PATENTS 3,523,517 8/1970 Corbani .................... 118/500

*Primary Examiner*—Morris Kaplan

*Attorney*—Charles R. Lepchinsky, Patrick J. Schlesinger and Jay M. Cantor

[57] ABSTRACT

Each carrier in a plurality of tiers of hoop-like carriers for individual silicon wafers is rotated about its own translating axis as the carrier is orbited about a central source of evaporant material. Carrier support means includes at least a three track system. The tracks are vertically spaced from one another and horizontally disposed about a common axis. Each carrier is supported on a lower track and rests on the next upper track. Rotation of either track of a cooperating pair imparts the compound motion.

4 Claims, 6 Drawing Figures

PATENTED JUL 11 1972 3,675,624

SHEET 1 OF 3

INVENTOR
BARNEY O. HUNTS
WILLIAM O. LYON
BY Charles R. Lepchinsky

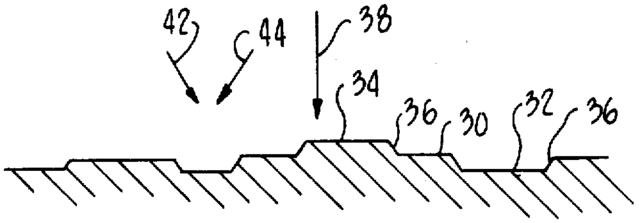
Fig. 4
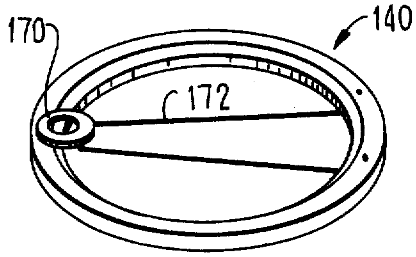
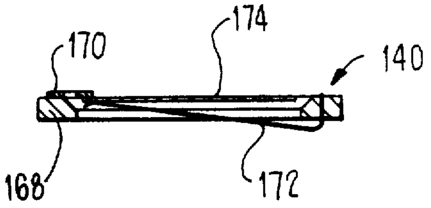
Fig. 5 Fig. 6
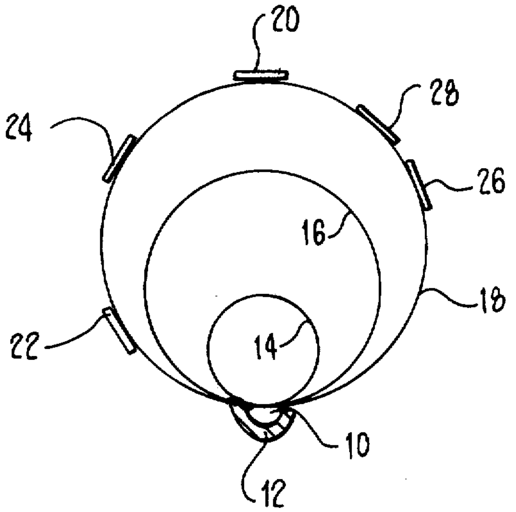
Fig. 3

APPARATUS FOR ROTATING WORK FOR THIN FILM DEPOSITION

BACKGROUND OF THE INVENTION

1. Field of the Invention

The present invention relates to the deposition of metals and other materials, as in a vacuum, in the manufacture of integrated electronic circuits, as on silicon wafers.

2. Prior Art

It is known to be desirable to position a wafer tangent to a spherical equi-deposition contour above an evaporative source of metal. It is known that, because previous processing will have given the wafer an irregular surface, it is desirable that the metal strike the wafer at an angle (such as 30° off normal) and that the wafer be rotated to promote uniform deposition on all flanks of projections and depressions.

It is known to be desirable to move a wafer about in the deposition field for "averaging out" directional non-uniformities of the throwing-off of the metal, and in so doing to have it osculate on (move upon while remaining tangent to) the spherical, equi-deposition contour.

It is known to mount several (such as six) wafers on individual carriers on an axially mounted wheel, to roll and axially guide such wheel about a circular track while individually turning each carrier (planet-like) on the wheel. But such arrangement has been complicated and clumsy and awkward to load and unload. And because of the size of the wheel, it has (1) imposed a large variation on the angle of incidence and (2) departed substantially from the desired osculating relation of the individual wafers to the equi-deposition contour.

It is known to fix several (such as 8 or 12) wafers in a rotatable, dish-shaped, axially mounted wheel for holding all the wafers tangent to the equi-deposition contour, and to roll, and axially guide, the wheel about a circular track above the metal source. While such arrangement provides substantial osculation, it is cumbersome and awkward, and the metal strikes each wafer at different angles of incidence from different directions so that the deposition on the sloping flanks of depressions are nonuniform.

SUMMARY OF THE INVENTION

It is an object of the present invention to provide, in thin-film deposition apparatus, a support mechanism for a substrate, such as a semiconductor wafer, that is simple in construction and operation, is convenient for loading and unloading, maintains a substantially constant angle of incidence to deposition and keeps the wafer in osculating relation to the equi-deposition contour.

In accordance with the present invention, hoop-like tracks for wafers of semiconductor material in the manufacture of integrated circuits rest on a circular track and lean at a desired angle against another track. The carriers roll about the tracks to vary the direction of deposition while maintaining substantially constant deposition rate and angle of deposition incidence. The carriers require no fastening but are simply set on the tracks and may be individually removed, unloaded, reloaded and replaced.

DESCRIPTION OF THE DRAWINGS

These and other objects and advantages will be apparent from the following descriptions of a specific embodiment of the invention, taken in connection with the accompanying drawings, wherein:

FIG. 3 is a diagram for illustrating a characteristic of evaporative deposition;

FIG. 4 is an enlarged, sectional view of a portion of a surface to be coated; and FIGS. 5 and 6 are views of a carrier for wafers, usable in the apparatus of FIGS. 1 and 2.

DESCRIPTION OF THE PREFERRED EMBODIMENT

Figure 1:
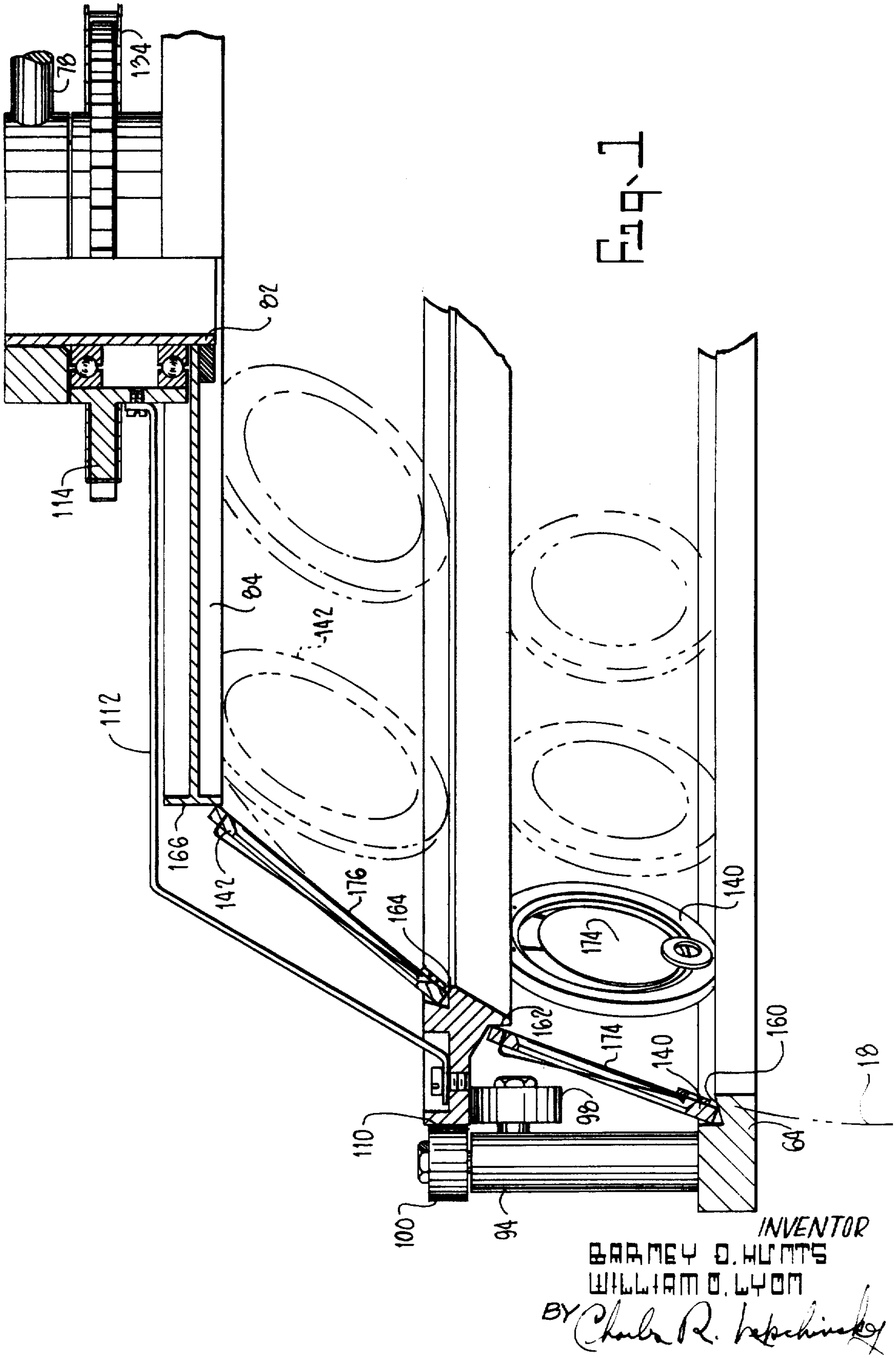
FIG. 1 is a partial sectional elevation taken along 1—1 of FIG. 2 of relatively movable carrier supports, or track members, for rolling work according to the present invention.

FIG. 3 shows a crucible, or treatment center, 12 in which metal is heated and melted to form a pool 10. When so heated in vacuum, the metal pool 10 gives off metal vapor substantially uniformly in all directions above the rim of the crucible. Then spheres, such as 14, 16, 18 tangent to the surface of the metal 10, constitute equi-deposition contours, for wafers tangent thereto.

Thus, a wafer at 20 directly facing the crucible 12, to receive metal at the same rate needs to be farther away than a wafer at 22 which does not directly face the crucible. The different positions about a contour, such as 18, provide the same rate of deposition at different aspect angles with respect to the metal pool 10. In the construction of the present invention, a pair of wafers one above the other at 26 and 28 and both tangent to contour 18, will receive metal at angles of incidence of about 40° and 24' from normal, respectively, that is, 40° and 24° from perpendicular.

FIG. 4 illustrates the unevenness of the surface 30 of a wafer on which metal is to be deposited. Because of previous etchings, depositions and maskings, the surface 30 will have depressions 32 and rises 34 flanked by slopes 36. If the metal to be deposited were projected perpendicularly onto the surface 30, that is, in the direction indicated by arrow 38, the metal would be deposited in much thicker layers on the "level" bottoms of depressions and tops of rises 34 than on the slopes such as 36. Accordingly, it is desired to project the metal at an angle and from all sides as indicated by arrows 42 and 44. The optimum angle of incidence depends on the angles of the slopes, such as 36, and that angle may vary from one layer to the next in the etching, deposition and other processing of the wafer. It is desirable, however, that the angle of incidence be substantially the same for all directions of incidence, as for example, the arrows 42 and 44 in FIG. 4 so that in each layer, all sloping flanks receive substantially the same thickness of metal.

Figure 2:
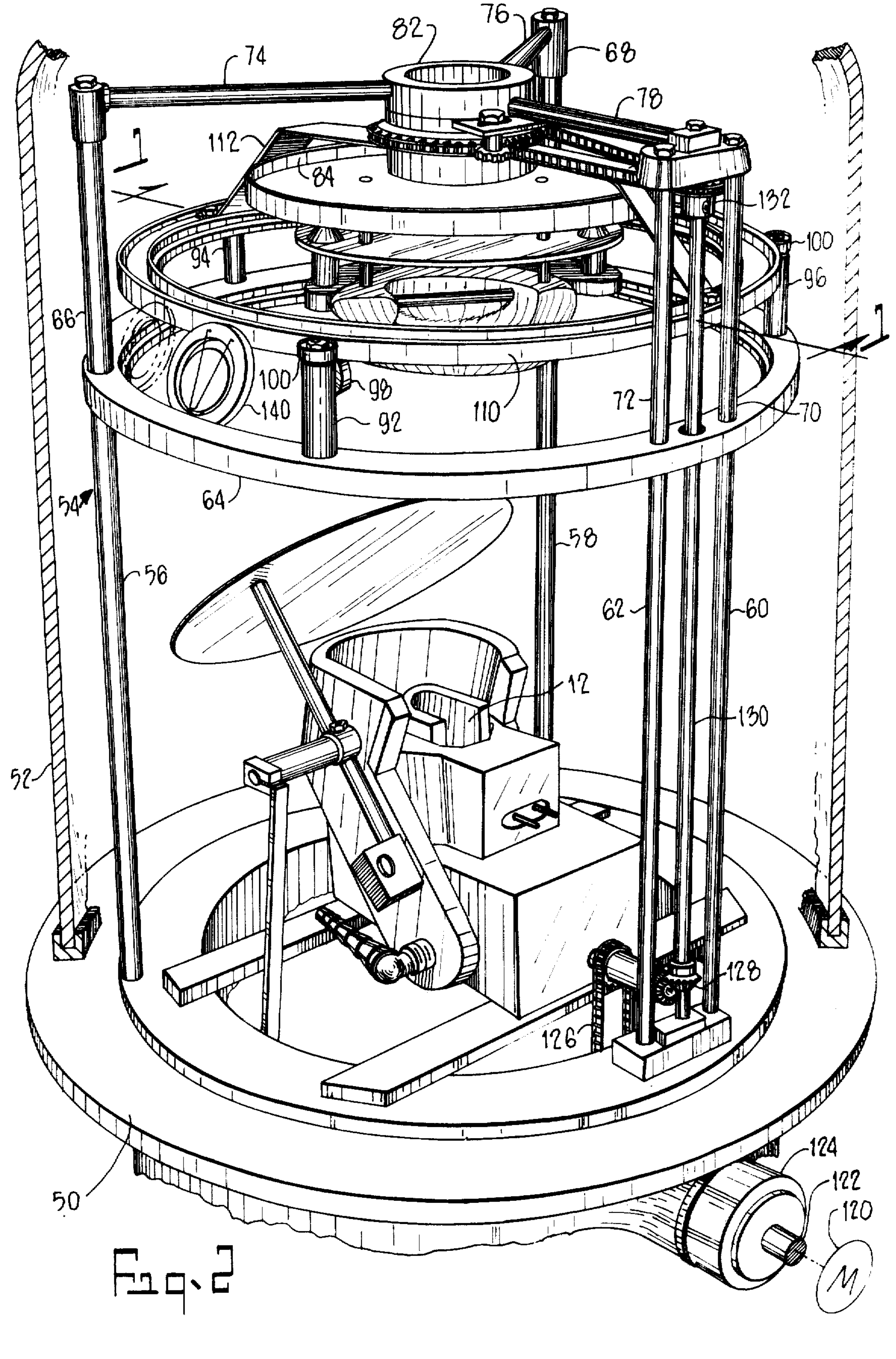
FIG. 2 is a perspective view, partly broken, of apparatus for depositing metal by evaporation in a vacuum.

In the construction of the present invention, in FIG. 2, a base 50 for a bell jar 52 carries a framework 54, having posts 56, 58, 60, 62, a ring-shaped lower carrier support or track member 64, posts 66, 68, 70, 72, stretchers 74, 76, 78, a central vertical pipe 82, and a disc-shaped upper carrier support or track member 84, all fastened together in a rigid, stationary structure. Posts 92, 94, 96 (see also FIG. 1) on the lower carrier support 64 carry rollers 98, 100 which respectively support and guide a ring-shaped, rotatable, central carrier support or track member 110. A flexible, metal, strap-like bail 112 connects the rotatable support 110 to a sprocket wheel 14 (FIG. 1) that is rotatable about the stationary central pipe 82 of the frame 54. An electric motor, indicated diagrammatically at 120, drives a shaft 122 that extends through a vacuum-tight gland 124 in the base 50 to drive a chain 126 which, through gears 128, a vertical shaft 130, sprocket 132 and chain 134 (FIG. 1) drives the sprocket 114 for turning the central carrier support, or track member 110. The support 110, when so driven, travels on the rollers 98 and within the rollers 100.

The three carrier supports 64, 110 and 84, FIGS. 1 and 2, provide tracks for rollable wheel-like carriers 140 and 142, of which a carrier 140 is shown in detail in FIGS. 5 and 6. The carrier 140 consists of a metal annulus, or ring, 168, a small ear 170 welded to the face of the annulus 168 and overhanging the opening, and a spring bail 172 which is biased toward the ear 170 for gripping the edge of a wafer 174 as shown in FIG. 6. The wafer typically is 0.010 inch thick and is adequately held by a grip of 1 ounce.

As seen in FIG. 1, a groove 160 around the upper, inner edge of the lower carrier support 64 provides an inward facing track, or raceway, on which individual carriers 140 may be set. The central carrier support 110 has an outward-facing surface 162 which constitutes a track, or raceway, against which a carrier 140 on the track 160 may lean. Similarly, a groove 164 on the central carrier support 110 and the outer surface 166 of the upper carrier support 84 constitute tracks for carriers 142.

As is shown in FIG. 1, the wafers 174 and 176 held in the carriers 140 and 142 lie substantially tangent to the spherical equi-deposition contour 18. (See also FIG. 3.) The crucible 12 for supporting the metal to be deposited on the wafers is located below the carrier supports 64, 110 and 84 and on the vertical center line of the apparatus, in the position shown in FIGS. 2 and 3.

In operation, wafers to be coated are slipped into the carriers 140, 142 as shown in FIG. 6, and the individual carriers are set in place on the tracks 160, 162 and 164, 166 as shown in FIGS. 1 and 2.

The motor 120 may then be energized to drive the central carrier support 110. Each carrier 140 rolls between and along its two tracks 160 and 162 on the carrier supports 64 and 110, and, similarly to a ball bearing, follows the carrier support 110 around but at a speed less than the speed of the moving carrier support. The carriers 142 similarly roll between the tracks 164 and 166 on carrier supports 110 and 84, and similarly follow the carrier support 110.

The carriers 140 and 142, FIG. 1, may accommodate wafers, for example, up to diameters of 1½ and 2 inches respectively. The central carrier supports 110 have a diameter of about 16 inches, and may turn at a speed of 20 revolutions per minute.

It will be apparent that carriers 140 and 142 support the wafers 174 and 176 tangent to the equi-deposition contour 18, as they roll with the movement of carrier support 110. The action of traveling around the apparatus varies the direction, with respect to the crucible 12 from which each wafer receives metal. The action of rolling causes each wafer to turn for varying the direction of incidence, with respect to itself, at which it receives metal as indicated by the arrows 42, 44 in FIG. 4.

Several carriers on a pair of tracks, as carriers 140 on tracks, 160, 162, will roll in unison and maintain their spacings as the support 110 turns. During loading and unloading, the motor 120 may be energized briefly for turning the central carrier a partial turn at a time, so that all placing and removal of carriers can be done at one position.

What is claimed is:

1. An apparatus for orbiting wheel-like article carriers about a treatment center and rotating them individually while holding them at a substantially constant aspect angle with respect to said treatment center, comprising in combination, a. three carrier supports providing coaxial, circular, level track for the wheel-like article carriers, b. the first of said supports having a first of said tracks, said first track including an upward and inward facing raceway for such article carriers, c. the second of said supports having a second of said tracks, said second track being of smaller diameter and above said first track and facing outward to provide a surface against which a wheel-like article carrier on said first track can lean, d. said second support having also a third track including an upward and inward facing race-way for such article carriers, e. the third of said supports having a fourth track above and inward of said third track against which an article carrier on said third track can lean, and f. means for rotating said second support relative to said first and third supports for causing wheel-like article carriers on said tracks to roll about said raceways.

2. The apparatus of claim 1 wherein said first and third tracks are each formed of a pair of generally circular flat wall surfaces joined at an acute angle.

3. The apparatus of claim 1 further including at least one of said article carriers positioned for oribital rotational movement, said carrier comprising an annular member provided with a support tab and a resilient spring-like member for engaging one of said objects therebetween.

4. The apparatus of claim 3 wherein said support tab extends inwardly of the inner circumference of said annular member and said spring-like member is diametrically disposed of said annular member.

* * * * *